United States Patent [19]
Nilsen

[11] Patent Number: 4,977,572
[45] Date of Patent: Dec. 11, 1990

[54] RESONANTLY PHOTO-PUMPED NICKEL-LIKE ERBIUM X-RAY LASER

[75] Inventor: Joseph Nilsen, Livermore, Calif.

[73] Assignee: The United States of America as represented by the Department of Energy, Washington, D.C.

[21] Appl. No.: 501,210

[22] Filed: Mar. 29, 1990

[51] Int. Cl.$^5$ .............................. H01S 3/09
[52] U.S. Cl. ........................ 372/69; 372/5; 372/39
[58] Field of Search ................ 372/69, 5, 39

[56] References Cited

U.S. PATENT DOCUMENTS

| | | |
|---|---|---|
| 3,826,996 | 7/1974 | Jaegle . |
| 4,229,708 | 10/1980 | Mani et al. . |
| 4,380,072 | 4/1983 | Harris . |
| 4,592,056 | 5/1986 | Elton . |
| 4,592,064 | 5/1986 | Silfvast . |
| 4,660,203 | 4/1987 | Hagelstein . |
| 4,731,789 | 3/1988 | MacGowan et al. ............ 372/5 |
| 4,803,687 | 2/1989 | Cochran et al. . |
| 4,827,479 | 5/1989 | Campbell et al. . |
| 4,870,648 | 9/1989 | Ceglio et al. ................... 372/5 |

OTHER PUBLICATIONS

Physics Today, pp. 17 to 19, Mar. 1985.
Matthews et al., Scientific American, pp. 86 to 91, Dec. 1988.

*Primary Examiner*—Léon Scott, Jr.
*Attorney, Agent, or Firm*—Henry Sartorio; L. E. Carnahan; William R. Moser

[57] ABSTRACT

A resonantly photo-pumped X-ray laser (10) that enhances the gain of several laser lines that also lase because of collisional excitations and recombination processes, is described.

The laser comprises an aluminum (12) and erbium (14) foil combination (16) that is driven by two beams (18, 20) of intense line focused (22, 24) optical laser radiation. Ground state nickel-like erbium ions (34) are resonantly photo-pumped by line emission from hydrogen-like aluminum ions (32).

7 Claims, 3 Drawing Sheets

RESONANTLY PHOTO-PUMPED NICKEL-LIKE ERBIUM X-RAY LASER

The U.S. Government has rights to this invention pursuant to Contract No. W-7405-ENG-48 between the U.S. Department of Energy and the University of California, for the operation of Lawrence Livermore National Laboratory.

BACKGROUND OF THE INVENTION

The invention described herein relates generally to resonantly photo-pumped X-ray lasers, and more particularly to a novel X-ray laser in which the gains of several laser lines that lase from collisional excitations and recombination processes are enhanced by resonant photo-pumping.

The first operational laboratory X-ray laser, which used collisional excitation as the pumping mechanism, was taught by Campbell and Rosen in U.S. Pat. No. 4,827,479 issued May 2, 1989. Moreover, this X-ray laser is also described by Rosen et al in Physical Review Letters 54, 106 (1985), with a discussion of the experimental demonstration of the laser provided by Matthews et al in Physical Review Letters 54, 110 (1985). This seminal work was also reported in Physics Today, March 1985, at pages 17 to 19. Additionally, a recent review of soft X-ray lasers is provided by Matthews and Rosen in Scientific American, December 1988.

The following are representative of the state-of-the-art in X-ray laser research and speculation: Cochran et al, in U.S. Pat. No. 4,803,687 issued Feb. 7, 1989, describe a sodium-neon laser target wherein Ne IX is (He-like Ne) resonantly photo-pumped by Na X (He-like Na). A carbon thermal buffer layer is required between the sodium and neon layers.

Hagelstein, in U.S. Pat. No. 4,660,203 issued Apr. 21, 1987, describes X-ray lasers wherein various multiply ionized species are used to pump high energy transitions in helium-like or hydrogen-like N, O, F, C or rare gases. The lasant material is located within a hollow container fabricated from parylene, or a material substantially transparent to radiation in the wavelength range from 60 to 300 Angstroms, and is multiply-ionized and undergoes at least one super-radiant laser transition.

Silfvast, in U.S. Pat. No. 4,592,064 issued May 27, 1986, discloses a scheme that permits high gain at visible and UV wavelengths in species such as Cd and Zn. A population inversion is established by producing a plasma that generates X-ray pulses in the 150 to 650 Angstrom wavelength range.

Elton, in U.S. Pat. No. 4,592,056 issued May 27, 1986, describes X-ray lasing systems wherein a neon-like sulfur plasma is used to pump a lithium-like neon plasma, and wherein a lithium-like silicon plasma is used to pump a lithium-like magnesium plasma.

Harris, in U.S. Pat. No. 4,380,072 issued Apr. 12, 1983, describes the method of exciting atoms to a storage level, then irradiating the excited atoms and thereby raising them to a higher level, whereupon the atoms lase to a lower level, other than ground, which is simultaneously emptied. This method results in the generation of XUV radiation.

Mani et al, in U.S. Pat. No. 4,229,708 issued Oct. 21, 1980, describe an X-ray laser wherein lithium-like atoms or ions are stimulated to lase by resonant or non-resonant antistokes Raman processes. The laser functions by directing filtered, black-body radiation in the soft X-ray region into a lithium-like vapor.

Jaegle et al, in U.S. Pat. No. 3,826,996 issued July 30, 1974, describe obtaining a medium having a negative absorption coefficient within the ultra-violet and X-ray range, by focusing a giant-pulse laser beam on an aluminum target.

Even though proposals have been made of many schemes using the resonant photo-pumping mechanism to drive various X-ray lasers, the fact is that the resonant photo-pumping mechanism has not as yet been actually demonstrated in the X-ray, or even the soft X-ray, region. The shortest wavelength at which significant gain has been measured using resonant photo-pumping is 2163 Angstroms in beryllium-like carbon pumped by a manganese plasma, in work reported by Qi and Krishnan, Phys. Rev. Lett. 59, 2051 (1987).

SUMMARY OF THE INVENTION

It is, therefore, an object of the invention to provide a resonantly photo-pumped X-ray laser.

Another object of the invention is to provide a resonantly photo-pumped X-ray laser that enhances the gain of laser lines that also lase because of collisional excitations and recombination processes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, an inventive resonantly photo-pumped X-ray laser is disclosed in which means are provided for producing a quantity of nickel-like erbium ions in the ground state, together with means for resonantly photo-pumping these ions to the $\overline{3d}_{3/2}4f_{5/2}(J=1)$ level, which decays directly to the upper laser states of the new laser. The resonant photo-pumping is accomplished by a means that generates a quantity of hydrogen-like aluminum ions in the $2p_{1/2}$ state, in spatial and temporal proximity to the nickel-like erbium ions, with the resonant photo-pumping taking place on a $2p_{1/2}$ to $1s_{1/2}$ emission line from the hydrogen-like aluminum ions.

In an embodiment of this invention, the X-ray laser comprises an aluminum foil upon which is deposited an erbium film, which together constitute an aluminum and erbium combination. Means are provided for simultaneously illuminating the aluminum and the erbium sides of the combination with beams of line focused, high power optical laser radiation. This driving illumination occurs over adjacent, long and thin and generally rectangular portions of the surfaces of the aluminum foil and erbium film combination. Preferably, the aluminum foil has a thickness in the approximate range from 100 to 20,000 Angstroms; and the erbium film has a thickness in the approximate range from 100 to 2000 Angstroms. Preferably, the two simultaneous, illuminating beams of driving optical laser radiation individually each have wavelengths within the approximate range from 0.25 to 11 microns; and temporal full widths at half maximum amplitude in the approximate range from 10 to 2000 picoseconds. Preferably, the beam that illuminates the aluminum side of the combination has a power density in the approximate range extending from $3 \times 10^{14}$ to $5 \times 10^{15}$ watts per centimeter squared, and the beam that illuminates the erbium side of the combination has a power density in the approximate range extending from $5 \times 10^{13}$ to $3 \times 10^{14}$ watts per centimeter squared. Preferably, the adjacent, illuminated, generally rectangular portions of the aluminum and erbium combination, each have a length in the approximate range from 0.4 to 8.0 centimeters, and a width in the approximate range from 50 to 200 microns.

The method for providing X-ray laser radiation of this invention, comprises the steps of providing a quantity of nickel-like erbium ions in the ground state, and resonantly photo-pumping these ions to the $\overline{3d}_{3/2}4f_{5/2}(J=1)$ level, which decays directly to upper laser states. The resonantly photo-pumping step may be accomplished by generating a quantity of $2p_{1/2}$ state hydrogen-like aluminum ions, in spatial and temporal proximity to the nickel-like erbium ions, and resonantly photo-pumping on a $2p_{1/2}$ to $1s_{1/2}$ emission line.

In another aspect of this invention, X-ray laser radiation may be provided by the single step of simultaneously illuminating the opposite sides of a combination comprised of an aluminum foil, upon which an erbium film has been deposited, with two driving beams of line focused, high power optical laser radiation, over adjacent, long and thin and generally rectangular portions of the aluminum and erbium sides of the combination.

The benefits and advantages of the present invention, as embodied and broadly described herein, include, inter alia, the provision of a novel resonantly photo-pumped X-ray laser that enhances the gain of several laser lines that also lase because of collisional excitations and recombination processes.

BRIEF DESCRIPTION OF THE DRAWINGS

The accompanying drawings, which are incorporated herein and form a part of the specification, illustrate an embodiment of the invention and, together with the description, serve to explain the principles of the invention. In the drawings.

DETAILED DESCRIPTION OF THE INVENTION

Figure 1:
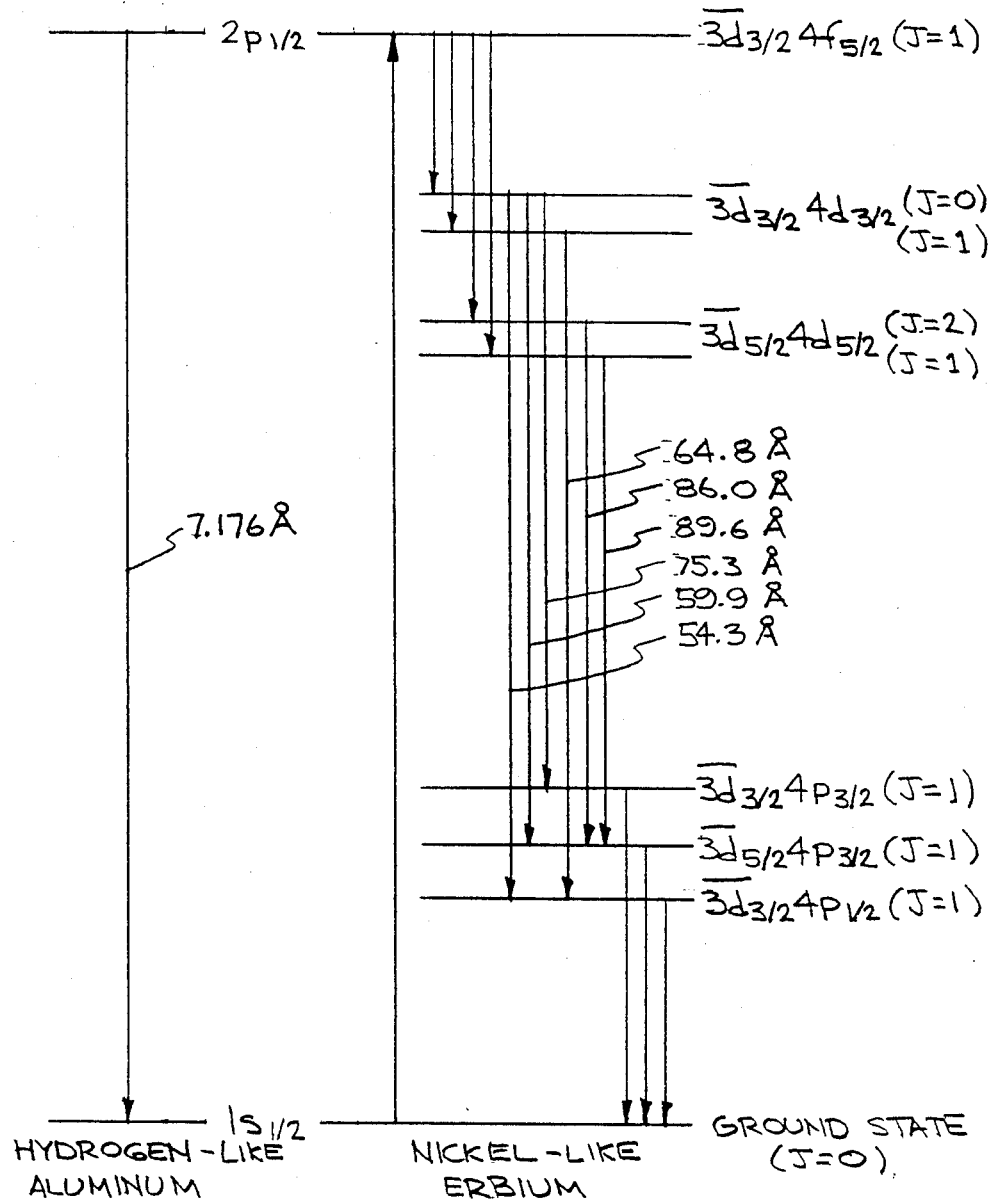
FIG. 1 is the energy level diagram of the X-ray laser of this invention.

The lasing scheme of the novel X-ray laser of this invention is shown in the energy level diagram of FIG. 1. The process comprises resonantly photo-pumping nickel-like erbium ions in the ground state ($J=0$) to the $\overline{3d}_{3/2}4f_{5/2}(J=1)$ level. This is accomplished using hydrogen-like aluminum $2p_{1/2}$ to $1s_{1/2}$ line emission, that is calculated to be at approximately 7.176 Angstroms, as shown. The $\overline{3d}_{3/2}4f_{5/2}(J=1)$ level decays directly to the $\overline{3d}_{3/2}4d_{3/2}(J=0 \text{ and } 1)$ and the $\overline{3d}_{5/2}4d_{5/2}(J=2 \text{ and } 1)$ levels, which are the four upper laser states of the X-ray laser, as shown. These upper laser states decay directly to the three $\overline{3d}_{3/2}4p_{3/2}(J=1)$, $\overline{3d}_{5/2}4p_{3/2}(J=1)$, and $\overline{3d}_{3/2}4p_{1/2}(J=1)$ levels, which together constitute the lower laser states, and thereby provide X-ray laser radiation according to the scheme shown in FIG. 1 and the following table.

TABLE

| Computed Laser Transitions for Nickel-Like Erbium | |
|---|---|
| Transition | Wavelength, Angstroms |
| $\overline{3d}_{3/2}4d_{3/2}(J=0) \longrightarrow \overline{3d}_{3/2}4p_{1/2}(J=1)$ | 54.3 |
| $\overline{3d}_{3/2}4d_{3/2}(J=0) \longrightarrow \overline{3d}_{5/2}4p_{3/2}(J=1)$ | 59.9 |
| $\overline{3d}_{3/2}4d_{3/2}(J=0) \longrightarrow \overline{3d}_{3/2}4p_{3/2}(J=1)$ | 75.3 |
| $\overline{3d}_{5/2}4d_{5/2}(J=2) \longrightarrow \overline{3d}_{5/2}4p_{3/2}(J=1)$ | 86.0 |
| $\overline{3d}_{5/2}4d_{5/2}(J=1) \longrightarrow \overline{3d}_{5/2}4p_{3/2}(J=1)$ | 89.6 |
| $\overline{3d}_{3/2}4d_{3/2}(J=1) \longrightarrow \overline{3d}_{3/2}4p_{1/2}(J=1)$ | 64.8 |

The three lower laser states rapidly decay to the ground state ($J=0$). Even in the absence of any hydrogen-like aluminum pumping radiation, it is expected that the five laser transition lines at 54.3, 59.9, 75.3, 86.0, and 89.6 Angstroms would all be present in a nickel-like erbium plasma, because of collisional excitation and recombination processes. However, the presence of hydrogen-like aluminum pumping radiation is expected to significantly enhance the gain of each of the lines, except the one at 86.0 Angstroms, which is expected to remain essentially unaffected by photo-pumping. On the other hand, the laser line at 64.8 Angstroms is only expected to exhibit gain when hydrogen-like aluminum is present to photo-pump the nickel-like erbium. In this application, the bar, or line, over the 3d states represents a single electron hole in an otherwise closed M shell [$1s^22s^22p^63s^23p^63d^{10}$] configuration or nickel-like core. Unlike all past resonant photo-pumping schemes, the novel X-ray laser of this invention has a tremendous advantage in enhancing the gain of several laser lines already expected to lase solely from collisional excitations and recombination processes, and which therefore should be very easy to observe, even in the case of a relatively weak pump line, since the photo-pumping is expected to increase laser transition lines having an already finite exponential gain.

Figure 2:
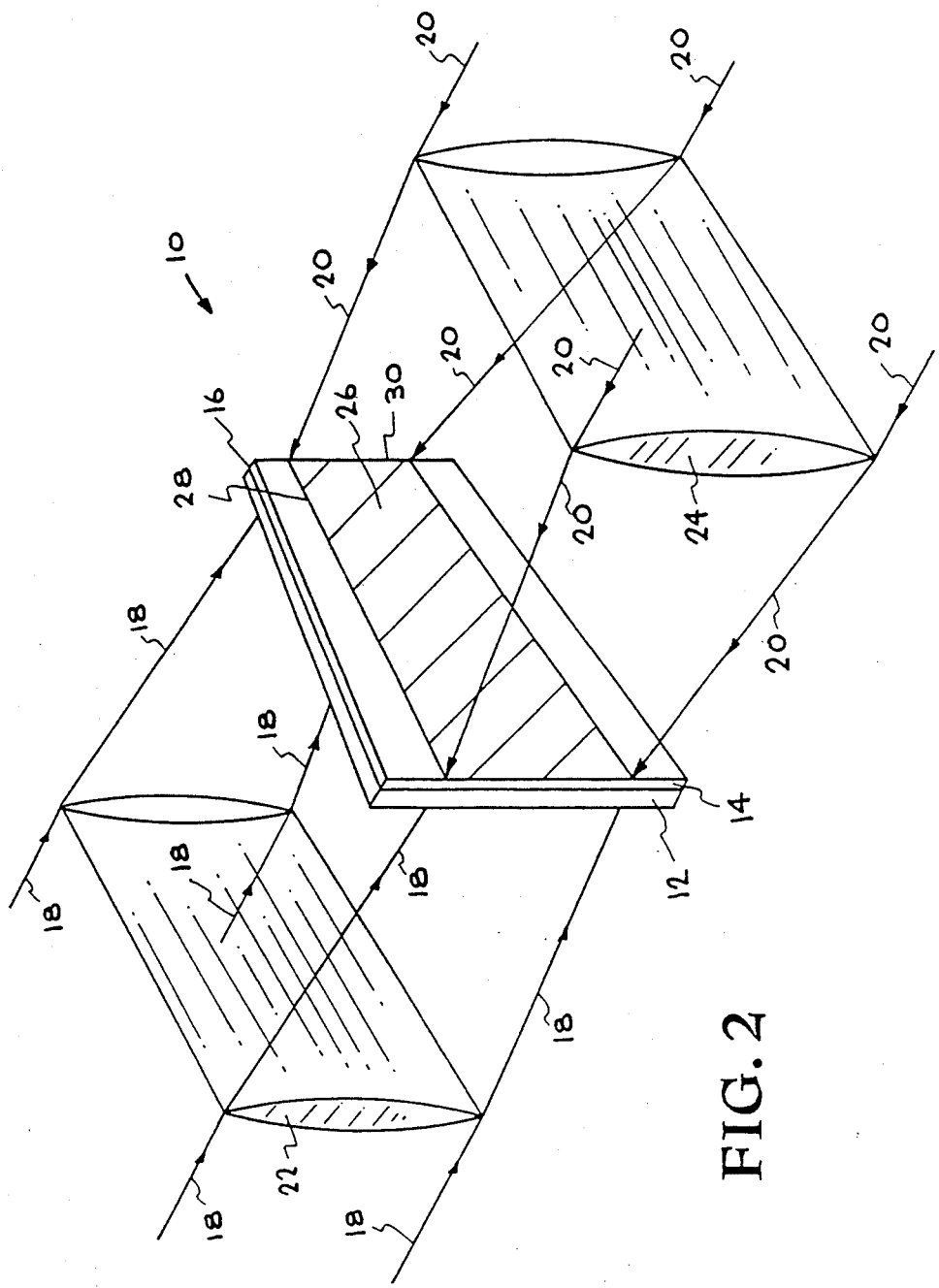
FIG. 2 is a schematic view of an X-ray laser in accordance with this invention, shown at an early time in its performance.
Figure 3:
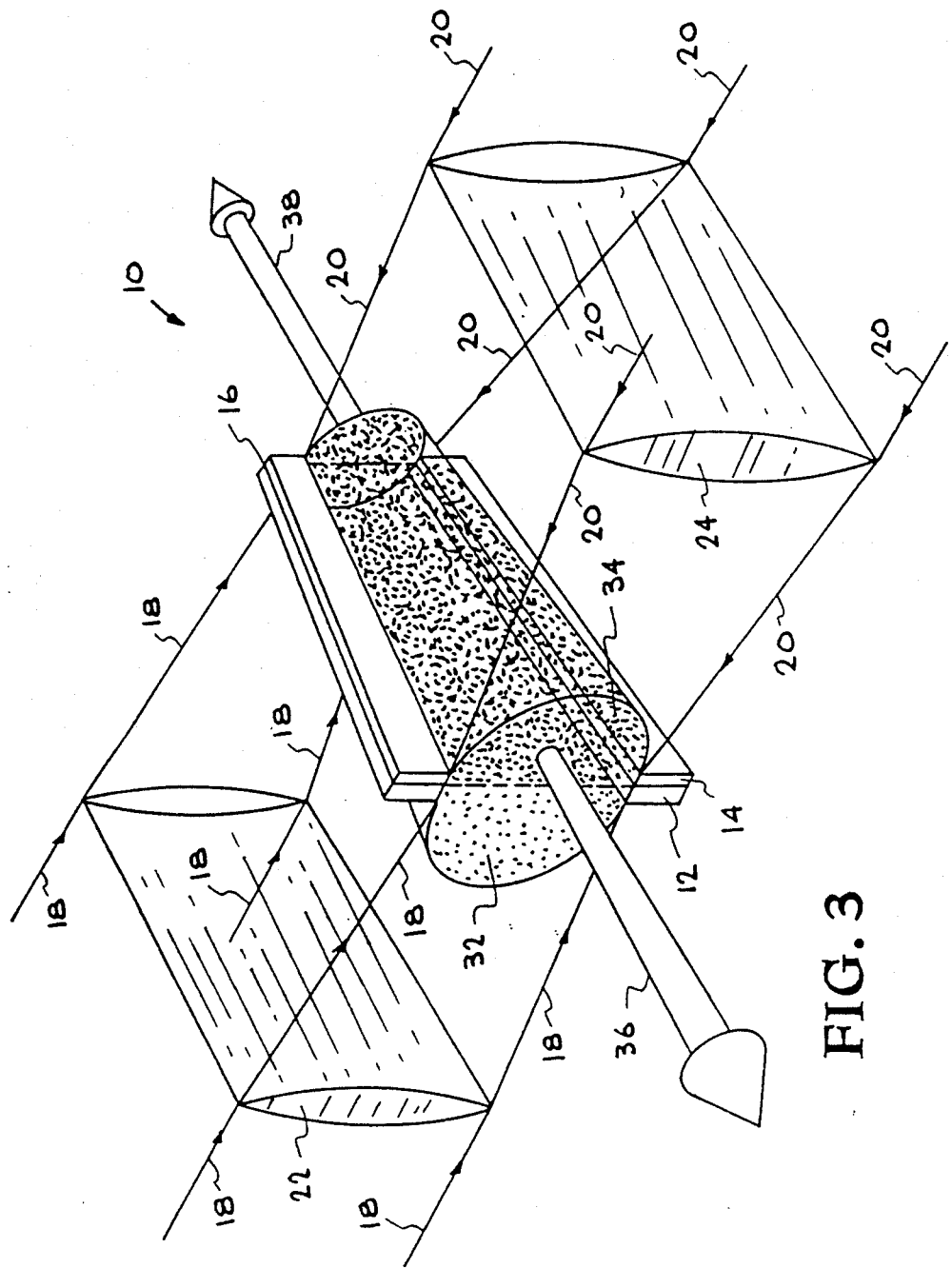
FIG. 3 is a schematic view of the X-ray laser of FIG. 2, shown at a later time in its performance, when vigorously producing X-ray laser radiation.

FIGS. 2 and 3 offer a schematic view of an X-ray laser 10, in accordance with this invention. X-ray laser 10 is the presently preferred embodiment of this invention, although it is believed that many different and highly beneficial embodiments of this invention may be realized in various situations and applications. X-ray laser 10 is shown at an early time in its performance in FIG. 2, and at a later time, when vigorously producing X-ray laser radiation, in FIG. 3. A consistent set of reference numerals is used in FIGS. 2 and 3. Since laser 10 is an X-ray laser, it utilizes no mirrors; therefore, amplification takes place on only a single pass through the system In this respect, X-ray laser 10 is typical of several previously known X-ray lasers.

X-ray laser 10 is comprised of an aluminum foil 12, that is flat and preferably has a thickness in the approximate range from 100 to 20,000 Angstroms. An erbium film 14, flat and having a preferred thickness in the approximate range from 100 to 2000 Angstroms, is deposited upon, or attached to, aluminum foil 12, by techniques that are very well known in the prior art. In some embodiments of this invention, aluminum foil 12 and erbium film 14 may each be attached to and supported by a very thin separating plastic layer, not shown, comprised of, for example, mylar or parylene. This plastic layer may provide hydrodynamic isolation between the two foils. Aluminum foil 12 and erbium film 14 together provide a combination 16. The aluminum side of combination 16 is illuminated by a beam of line focused, high power optical laser radiation 18, while, simultaneously, the erbium side of combination 16 is illuminated by a beam of line focused, high power optical laser radiation 20, as shown. As schematically indicated, optical laser beams 18 and 20 are line focused by a pair of cylindrical lenses 22 and 24, respectively, by techniques that are very well known in the laser-related arts. Preferably, the two simultaneous beams of optical laser radiation 18 and 20 individually each have a wavelength or wavelengths in the approximate range from .25 to 11 microns, and a temporal full width at half maximum amplitude in the approximate range from 10 to 2000 picoseconds. Optical laser beam 18, that illuminates aluminum foil 12, preferably has a power density in the approximate range extending from $3 \times 10^{14}$ to $5 \times 10^{15}$ watts per centimeter squared, and optical laser beam 20, that illuminates erbium film 14, preferably has a power density in the approximate range extending from $5 \times 10^{13}$ to $3 \times 10^{14}$ watts per centimeter squared. Optical laser pulses having characteristics within these ranges are routinely provided by the Lawrence Livermore National Laboratory, located at Livermore, Calif. Optical laser beams 18 and 20 each illuminate an adjacent, long and thin and generally rectangular area on an opposite side of the aluminum and erbium combination 16. In particular, an area 26 on the erbium side of combination 16, is shown in FIG. 2 as illuminated by the optical laser beam 20. A similar area, not specifically shown, on the aluminum side of combination 16, is illuminated by optical laser beam 18. The area, or surface portion, 26 preferably has a length 28 in the approximate range from 0.4 to 8.0 centimeters, and a width 30 in the approximate range from 50 to 200 microns.

As shown in FIG. 3, the optical laser beams 18 and 20 energetically convert the portions of the combination 16 upon which they impinge, into an aluminum plasma 32, and an erbium plasma 34. The erbium plasma 34 provides very many nickel-like erbium ions in the ground state. The aluminum plasma 32, which is in spatial and temporal proximity to plasma 34, provides an abundant quantity of hydrogen-like aluminum ions in the $2p_{1/2}$ state, which aluminum ions emit a large amount of $2p_{1/2}$ to $1s_{1/2}$ line emission radiation, which radiation proceeds into plasma 34 and resonantly photo-pumps many of the nickel-like erbium ions that are contained in the plasma 34, to the $\overline{3d}_{3/2}4f_{5/2}(J=1)$ level. The nickel-like erbium ions, in the $\overline{3d}_{3/2}4f_{5/2}(J=1)$ level, in plasma 34, proceed to provide, in accordance with the mechanisms particularly discussed above in reference to the energy level diagram of FIG. 1, a pair of X-ray laser beams 36 and 38, schematically indicated, that comprise X-ray laser radiation.

It is thus appreciated that in accordance with the invention as herein described and shown in FIGS. 1 to 3, a novel resonantly photo-pumped X-ray laser is provided that enhances the gain of several laser lines that also lase because of collisional excitations and recombustion processes.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. In a resonantly photopumped X-ray laser, enhancing the gain of several laser lines, comprising:
   means for providing a quantity of nickel-like erbium ions in the $J=0$ ground state; and
   means for resonantly photo-pumping the quantity of nickel-like erbium ions from their $J=0$ ground state to $3d_{3/2}4f_{5/2}$ ($J=1$) level, which decays directly to upper laser states of said nickel-like erbium.

2. In an X-ray laser as recited in claim 1, wherein the means for resonantly photo-pumping the quantity of nickel-like erbium ions comprises means for generating, in spatial and temporal proximity to the quantity of nickel-like erbium ions, a quantity of hydrogen-like aluminum ions in the $2p_{1/2}$ state, which resonantly photo-pumps on a $2p_{1/2}$ to $1s_{1/2}$ emission line.

3. In a resonantly photopumped X-ray laser, enhancing the gain of several laser lines, comprising:
   an aluminum foil;
   an erbium film deposited on the aluminum foil, to thereby provide an aluminum foil and erbium film combination; and
   means for resonantly photopumping the erbium to upper laser states by simultaneously illuminating opposite sides of said aluminum foil and erbium film combination with a first and a second beam of line focused, high power optical laser radiation, with the illumination occuring over adjacent, long and thin and generally rectangular portions of the aluminum and erbium combination.

4. In an X-ray laser as recited in claim 3, wherein the aluminum foil has a thickness in the approximate range from 100 to 20,000 Angstroms; wherein the erbium film has a thickness in the approximate range from 100 to 2000 Angstroms; wherein the first and second simultaneous beams of optical laser radiation individually each have a wavelength in the approximate range from 0.25 to 11 microns and a temporal full width at half maximum amplitude in the approximate range from 10 to 2000 picoseconds, with the beam that illuminates the aluminum side of the combination having a power density in the approximate range from $3 \times 10^{14}$ to $5 \times 10^{15}$ watts per centimeter squared, and with the beam that illuminates the erbium side of the combination having a power density in the approximate range from $5 \times 10^{13}$ to $3 \times 10^{14}$ watts per centimeter squared; and wherein the adjacent, generally rectangular illuminated portions of the aluminum and erbium combination, each have a length in the approximate range from 0.4 to 8.0 centimeters, and a width in the approximate range from 50 to 200 microns.

5. A method for providing resonantly photopumped X-ray laser radiation, the method comprising the steps of:
   providing a quantity of nickel-like erbium ions in the $J=0$ ground state; and resonantly photo-pumping the quantity of nickel-like erbium ions from their J=0 ground state to $3d_{3/2}4f_{5/2}$ (J=1) level, which decays directly to upper laser states of said nickel-like erbium.

6. The method of claim 5, wherein the resonantly photo-pumping step comprises the step of generating a quantity of hydrogen-like aluminum ions, in the $2p_{1/2}$ state, in spatial and temporal proximity to the quantity of nickel-like erbium ions, whereby the resonant photo-pumping occurs on a $2p_{1/2}$ to $1s_{1/2}$ emission line in the hydrogen-like aluminum.

7. A method for providing resonantly photopumped X-ray laser radiation comprising the step of resonantly photopumping erbium ions to upper laser states by simultaneously illuminating the opposite sides of a combination comprised of an aluminum foil that has an erbium film deposited on one side thereof, with a first and a second beam of line focused, high power optical laser radiation, over adjacent, long and thin and generally rectangular portions of the aluminum and erbium combination.

* * * * *